(12) United States Patent
Clingerman et al.

(10) Patent No.: US 8,574,776 B2
(45) Date of Patent: Nov. 5, 2013

(54) FUEL CELL SYSTEM WATER MANAGEMENT STRATEGY FOR FREEZE CAPABILITY

(75) Inventors: Bruce J. Clingerman, Palmyra, NY (US); Jason R. Kolodziej, West Henrietta, NY (US); Derek S. Kilmer, Rochester, NY (US); Pinkhas A. Rapaport, Fairport, NY (US); David S. Mathews, Howell, MI (US); Shyam Kocha, West Henrietta, NY (US); Abdullah B. Alp, Rochester, NY (US); Matthew K. Hortop, Rochester, NY (US); William H. Pettit, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 2511 days.

(21) Appl. No.: 11/475,695

(22) Filed: Jun. 27, 2006

(65) Prior Publication Data

US 2007/0298289 A1    Dec. 27, 2007

(51) Int. Cl.
*H01M 8/10* (2006.01)
(52) U.S. Cl.
USPC .......................................... 429/429; 429/442
(58) Field of Classification Search
USPC ................... 429/12, 22, 23, 13, 429, 442, 444
See application file for complete search history.

(56) References Cited

U.S. PATENT DOCUMENTS

2005/0257969 A1*  11/2005  Osborne et al. .............. 180/65.3
2007/0275281 A1*  11/2007  White .............................. 429/24

FOREIGN PATENT DOCUMENTS

| DE | 10 2005 004 388 A1 | 12/2005 |
| JP | 2003-115310 A | 4/2003 |
| JP | 2006-079865 A | 3/2006 |

* cited by examiner

*Primary Examiner* — Mark F Huff
*Assistant Examiner* — Monique Wills
(74) *Attorney, Agent, or Firm* — John A. Miller; Miller IP Group, PLC

(57) ABSTRACT

A fuel cell system that employs a method for determining the potential that a freeze condition will exist after the system is shut-down based on predetermined input, such as ambient temperature, geographical location, user usage profile, date, weather reports, etc. If the system determines that a freeze condition is probable, then the system initiates a purge shut-down of the fuel cell system where water is purged out of the reactant gas flow channels. If the system determines that a freeze condition is unlikely, then it will initiate a normal shut-down procedure without purging the flow channels. The system will then periodically determine if the conditions have changed, and will initiate the purge if a freeze condition subsequently becomes probable.

14 Claims, 2 Drawing Sheets

FUEL CELL SYSTEM WATER MANAGEMENT STRATEGY FOR FREEZE CAPABILITY

BACKGROUND OF THE INVENTION

1. Field of the Invention

This invention relates generally to a fuel cell system that employs an algorithm for determining whether product water in a fuel cell stack is likely to freeze after system shut-down, and if so, perform a stack purge and, more particularly, to a fuel cell system that employs an algorithm for periodically determining whether sub-zero conditions may exist after system shut-down so as to selectively perform a stack purge.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. The bipolar plates are made of a conductive material, such as stainless steel, so that they conduct the electricity generated by the fuel cells out of the stack. The bipolar plates also include flow channels through which a cooling fluid flows.

As is well understood in the art, fuel cells operate with a certain relative humidity based on the operating temperature of the fuel cell stack and the pressure within the stack to provide efficient stack operation. Also, the stack produces product water. Therefore, when the fuel cell stack is shut down, the MEAs within the stack have a certain amount of moisture. If the fuel cell system happens to be in a sub-zero environment, this moisture can freeze, which may damage the MEAs, diffusion media, plates and/or gaskets. Therefore, it is known in the art to dry the fuel cell stack and membranes therein at system shut-down to prevent the stack from being damaged as a result of freezing.

In one known technique, dry air is forced through the stack by the compressor to provide water purging and stack drying. Most of the moisture is present in the cathode side of the MEAs because of the product water, however, there is some moisture in the anode side of the MEAs because the MEA is wet and moisture diffuses through the MEA from the cathode side to the anode side. Therefore, stack drying techniques also direct the cathode air through the anode channels for drying purposes. Various methodologies are known in the art for providing the anode flow channel and/or cathode flow channel purge. In one known technique, the fuel cell stack power is used to operate the compressor to provide the air purge. However, this requires fuel to do this. Alternately, battery energy can be used to provide the purge. However, this reduces the battery's stored energy.

It is preferred that the reactant gas flow channel purge not be performed if the product water in the stack is not going to freeze because purging dries out the membranes, potentially reducing their life, and requires energy to operate the compressor to provide the purge. Therefore, it would be desirable to be able to predict whether the vehicle will be subject to freezing conditions after it is shut down.

SUMMARY OF THE INVENTION

In accordance with the teachings of the present invention, a fuel cell system is disclosed that employs a method for determining the potential that a freeze condition will exist after the system is shut-down based on predetermined input, such as ambient temperature, geographical location, date, weather reports, etc. If the system determines that a freeze condition is probable or likely, then the system initiates a purge shut-down of the fuel cell system where water and water vapor are purged out of the anode flow channels and/or cathode flow channels. If the system determines that a freeze condition is unlikely, then it will initiate a normal shut-down procedure without purging the anode flow channels and/or the cathode flow channels. The system will then periodically determine if the conditions have changed, and will initiate the reactant gas flow channel purge if a freeze condition subsequently becomes probable. If the system includes a keep warm strategy and a potential freeze condition does exist, then the system will determine whether there is enough fuel and/or battery energy to perform the keep warm strategy, and if not go through the flow channel purge.

The system can include a low power wake-up timer circuit to periodically wake up an engine controller to make the determination of whether the likelihood of a freeze condition has changed after shut-down. Alternately, the system can include a low power wake-up check circuit that determines the temperature, instead of using the higher power consumption engine controller to determine whether the freeze potential has changed after shut-down.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for determining whether a potential freeze condition is likely at fuel cell system shut-down, and if so, performing a reactant gas flow channel purge is merely exemplary in nature, and is in no way intended to limit the invention or its applications or uses.

Figure 1:
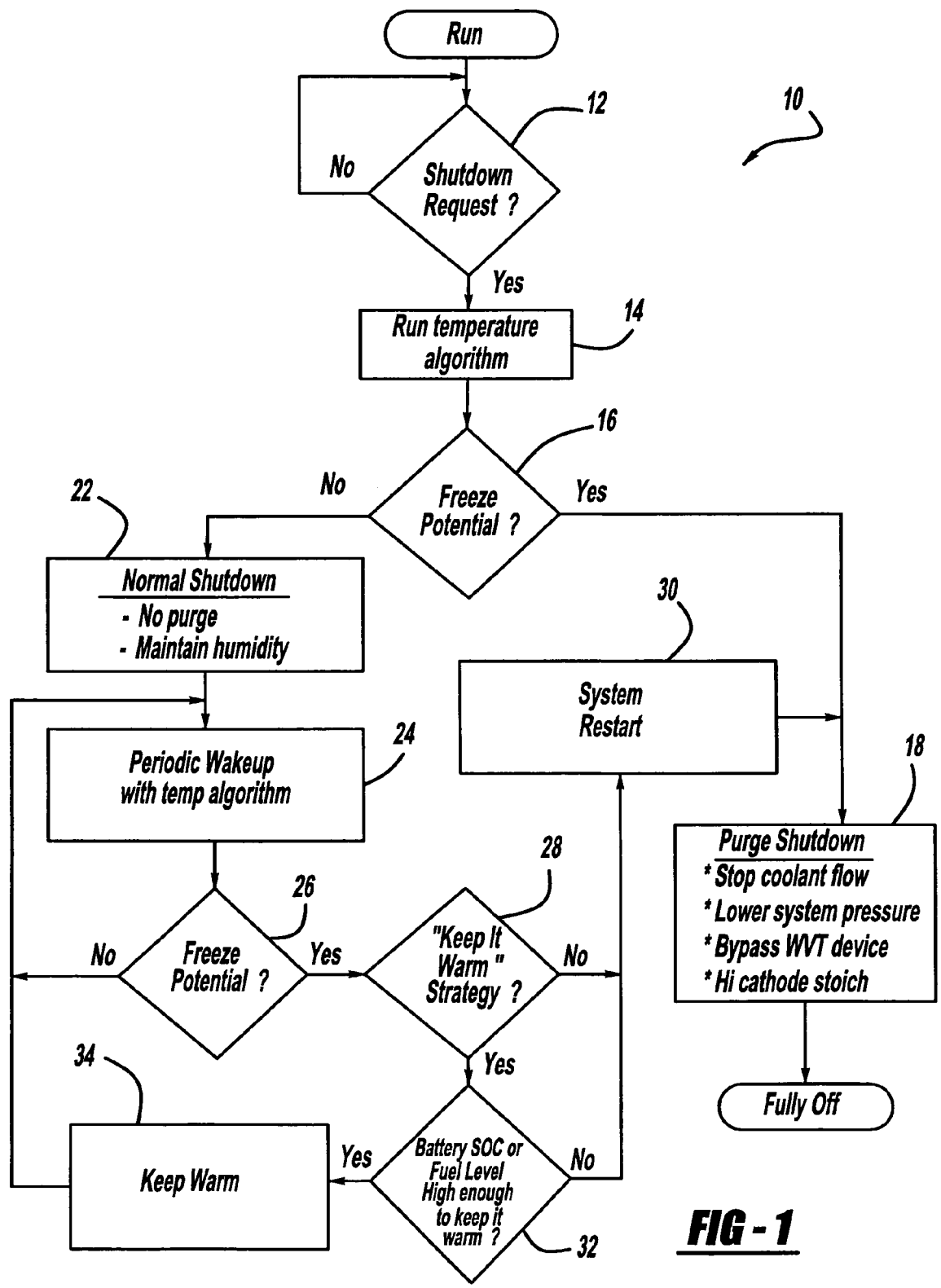
FIG. 1 is a flow chart diagram showing a process for determining whether a potential freeze condition exists at a fuel cell system shut-down, and if so, performing a reactant gas flow channel purge, according to an embodiment of the present invention.

FIG. 1 is a flow chart diagram 10 showing a process for determining whether a stack purge is necessary at fuel cell system shut-down because of the potential for a freeze condition, and periodically thereafter, according to an embodiment of the present invention. The algorithm determines whether a vehicle shut-down request has been made at decision diamond 12. If a shut-down request has been made at the decision diamond 12, then the algorithm runs a temperature algorithm to determine whether a freeze condition currently exists, or is likely or probable at box 14. Any suitable temperature algorithm can be used for this purpose, such as reading a temperature sensor that provides ambient temperature, cooling fluid temperature, stack temperature, or other suitable temperatures. Additionally, the algorithm can use wireless communications systems, such as GM's On-Star™, or receive GPS signals. In the GM On-Star™ embodiment, the algorithm can identify date and location to determine the likelihood of a freeze condition and even receive current weather information. For example, a vehicle in Florida in mid-summer has a low potential of a freeze condition at vehicle shut-down and a vehicle in January in Michigan has a high potential of a freeze condition. In the GPS embodiment, the algorithm can identify date and location to determine the likelihood of a freeze condition.

The algorithm then provides the information to a decision diamond 16 that determines whether a potential freeze condition exists. If a potential freeze condition does exist, then the algorithm initiates a purge shut-down at box 18 where the anode-side and/or cathode side reactant gas flow channels in the stack are purged using compressor air. Several things may happen during a purge shut-down, including by-passing a water vapor transfer (WVT) device at the cathode outlet, stopping the cooling fluid flow, lowering the fuel cell stack pressure and providing a high cathode stoichiometry. Some of these steps are designed to convert the liquid water to vapor so that it is more readily removed from the flow channels, such as lowering the system pressure. Further, stopping the cooling fluid flow keeps the stack from reducing its temperature quickly, which helps prevent water vapor from going into the liquid stage. The system pressure is lowered by opening a cathode exhaust back pressure valve. Providing a high cathode stoichiometry provides a relatively high flow of air from the compressor. By using fuel stack power to run the compressor, battery energy can be saved, however, a small amount of product water is continually generated.

If the algorithm determines that a potential freeze condition does not exist at the decision diamond 16, then it initiates the normal shut-down at box 22 that does not include a flow channel purge so as to maintain the humidity of the membranes as high as possible for the next system start-up. Because it is unknown how fast the weather conditions will change, how long the vehicle will be shut-down, and whether the vehicle will be moved while it is shut-down, it is necessary to periodically determine if the freeze condition potential has changed after system shut-down. Therefore, after the vehicle has been off for a predetermined period of time, the algorithm wakes up the vehicle electronic controller, or other device, to again determine whether the weather conditions warrant a potential freeze condition at box 24. The algorithm that determines whether the potential freeze condition exists at the box 24 can be the same algorithm used at the box 14, such as using ambient temperature sensors, GPS receivers, etc. Based on the information determined by the algorithm at the box 24, the algorithm then determines whether a potential freeze condition exists at decision diamond 26.

If no potential freeze condition exists at the decision diamond 26, then the algorithm will again go through the process of periodically waking up at the box 24 to perform the temperature algorithm. The algorithm will be designed and written so that the time interval for making the determination is based on many factors. The interval for making the freeze condition determination will affect how likely the purge shut-down is initially performed at system shut-down. In other words, if the system makes the freeze condition determination relatively often, then the initial decision to purge at system shut-down will decide not to purge unless the freeze condition potential is relatively high. In one embodiment, the determination is made every hour. Alternately, a model could estimate the appropriate time based on sensor inputs, such as the stack and ambient temperatures.

If the temperature algorithm determines that there is a potential freeze condition at the decision diamond 26, then the algorithm determines whether the vehicle has a "keep it warm" strategy at decision diamond 28. Some fuel cell vehicles may include an algorithm for operating the fuel cell stack when the vehicle is shut-off, so that the fuel cell stack can heat up and prevent the product water from freezing in the stack. If the vehicle does not include a "keep it warm" strategy, then the system is re-started at box 30 to perform the purge shut-down at the box 18.

If the vehicle does employ a "keep it warm" strategy at the decision diamond 28, then the algorithm determines whether it has enough fuel and/or battery energy to perform the "keep it warm" strategy at decision diamond 32. When the algorithm determines how much fuel and/or battery energy is acceptable, it could consider geographical and/or user usage profile information. For example, the algorithm could base the decision on the distance to a fueling station. If the vehicle does not have enough fuel and/or battery energy, then the algorithm goes to the system re-start box 30 to perform the purge shut-down operation at the box 18. If the vehicle does include enough fuel and/or battery energy at the decision diamond 32, then the algorithm operates the "keep it warm" strategy at box 34, and then after a predetermined period of time returns to the box 24 to determine whether a potential freeze condition exists as discussed above. Different techniques are known in the art to perform the "keep it warm" strategy, including operating the fuel cell stack for a predetermined period of time, or operating electric heaters using battery energy that keep the stack, cooling fluid and/or other components warm for a predetermined period of time.

Figure 2:
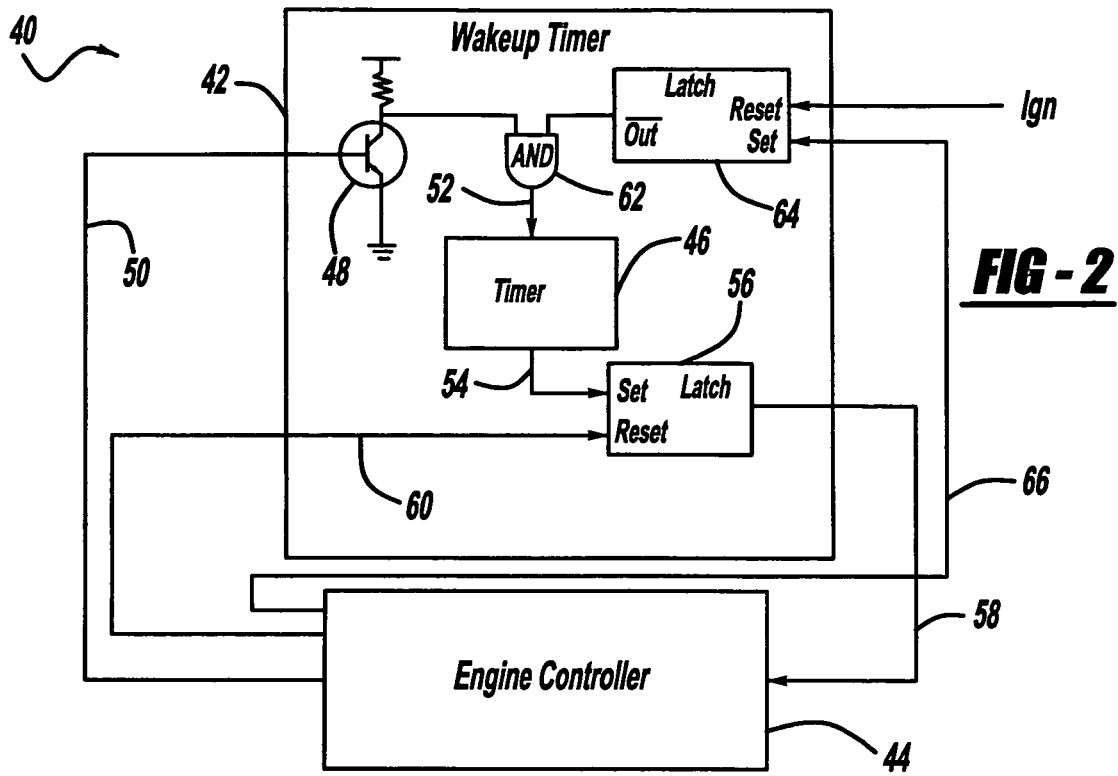
FIG. 2 is a schematic diagram of a wake-up timer circuit that periodically notifies the engine controller to determine whether a potential freeze condition has changed after system shut-down, according to an embodiment of the present invention.

FIG. 2 is a schematic diagram of a system 40 for providing the system wake-up at the box 24, according to an embodiment of the present invention. The system 40 includes a wake-up timer circuit 42 and an engine controller 44. The wake-up timer circuit 42 could be part of the engine controller 44. The wake-up timer circuit 42 includes a timer 46 and a transistor switch 48. When the engine controller 44 is operating during normal conditions, a high signal is applied to the base of the transistor switch 48 on line 50 that allows the transistor switch 48 to conduct. One input of an AND gate 62 is connected to the collector terminal of the transistor switch 48. The output of the AND gate 62 is a timer enable signal on line 52, which will be low when the transistor switch 48 is conducting, thus disengaging the timer 46. The other input to the AND gate 62 is a complementary output of a latch circuit 64, which will generally be high.

When the engine controller 44 shuts off at system shut-down, the transistor switch 48 stops conducting so that both inputs to the AND gate 62 are high, and the timer enable line 52 goes high activating the timer 46. When the timer 46 runs its preset count, it outputs a high signal on line 54 that sets a latch circuit 56 and wakes up the engine controller 44 on line 58, which causes the transistor switch 48 to conduct and turn off the timer 46. The engine controller 44 then goes through the process of determining the potential for a freeze condition, as discussed above, using an appropriate sensor or other techniques. After the engine controller 44 goes through the process of determining the potential freeze condition, it resets the latch circuit 56 on line 60.

If the engine controller 44 determines that a stack purge is necessary because the freeze condition potential has changed, as discussed above, it will output a high signal on line 66 to set the latch circuit 64, which causes the complementary output of the latch circuit 64 to go low so that the timer 46 is shut-off after the purge and the engine controller 44 is shut-down. The reset terminal of the latch circuit 64 is connected to the vehicle ignition, so that the latch circuit 64 is reset when the vehicle is started. Therefore, the engine controller 44 is only operated periodically, which reduces the power draw from the battery. The wake-up timer circuit 42 draws minimal power, and is not as much of a concern.

Figure 3:
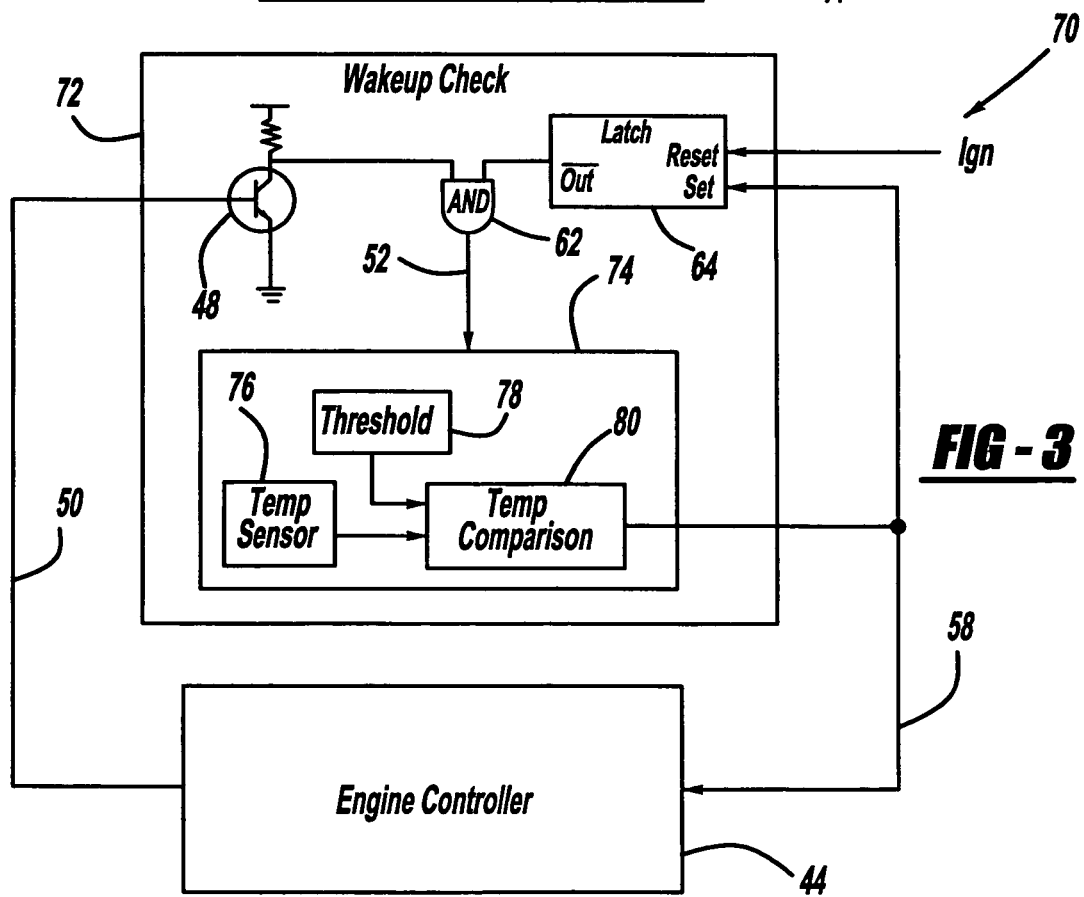
FIG. 3 is a schematic diagram of a wake-up check circuit that wakes up the engine controller if the temperature goes below a predetermined threshold temperature after system shut-down, according to another embodiment of the present invention.

FIG. 3 is a schematic diagram of a system 70, similar to the system 40, where like elements are identified by the same reference numeral. In this embodiment, the wake-up timer circuit 42 is replaced with a wake-up check circuit 72 that includes the transistor switch 48, the AND gate 62 and the latch circuit 64. The wake-up check circuit 72 could also be part of the engine controller 44. The wake-up check circuit 72 also includes a temperature circuit 74 that is enabled on the line 52. The temperature circuit 74 includes a temperature sensor 76 and a threshold circuit 78. The temperature signal from the temperature sensor 76 and the threshold signal from the threshold circuit 78 are applied to a temperature comparison device 80, such as an op-amp. If the temperature goes below the predetermined threshold, the temperature comparison circuit 80 wakes up the engine controller 44 on the line 58 to perform the purge. The output of the temperature comparison device 80 also sets the latch circuit 64 so that the wake-up check circuit 72 is disengaged after the purge in the manner as discussed above. Note that the wake-up timer circuit 42 and the wake-up check circuit 72 could be provided as a combined circuit.

In this embodiment, the engine controller 44 only wakes up when there is a potential freeze condition, and not each time a predetermined time interval goes by. Therefore, even though the wake-up check circuit 72 may be a little more costly and consume a little bit more power than the wake-up timer circuit 42, savings can be made in the amount of power that is used by the engine controller 44 to make the determination of whether a potential freeze condition exists. Alternately, the engine controller 44 can verify the potential freeze condition once it is woken up by the temperature comparison circuit 80. The temperature sensor 76 can be a thermocouple wire that is positioned against any suitable structure within the fuel cell system, such as a pipe within a fuel cell stack.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
a fuel cell stack including reactant gas flow channels;
a compressor for forcing air through the reactant gas flow channels; and
a controller configured to control the fuel cell system, said controller determining whether a potential freeze condition exists at fuel cell system shut-down based on predetermined parameters, said controller causing the compressor to purge the reactant gas flow passage-ways if the potential freeze condition does exist, said controller shutting the fuel cell system down normally without a reactive gas flow passage-way purge if the potential for a freeze condition does not exist, said controller periodically determining after the normal shut-down whether a potential freeze condition exists, said controller performing the reactant gas flow passage-way purge if the subsequent determination of a potential freeze condition exists, and said controller initiating a keep warm strategy after shut-down if the controller determines that the potential freeze condition exists before performing the purge, wherein the controller determines whether there is enough fuel or battery energy to perform the keep warm strategy, and if not, perform the purge.

2. The system according to claim 1 further comprising a temperature sensor, said temperature sensor providing a temperature signal to the controller that indicates whether the potential freeze condition exists.

3. The system according to claim 1 further comprising a receiver that receives wireless signals that provide an indication of the potential freeze condition.

4. The system according to claim 1 wherein the predetermined parameters include one or more of ambient temperature, cooling fluid temperature, stack temperature, geographical location, user usage profile, date and weather reports.

5. The system according to claim 1 further comprising a wake-up timer circuit, said wake-up timer circuit periodically waking up the controller after system shut-down to determine whether the potential freeze condition exists based on the predetermined parameters.

6. The system according to claim 1 further comprising a wake-up check circuit, said wake-up check circuit including a temperature sensor for measuring the temperature, said wake-up check circuit comparing the measured temperature to a temperature threshold to determine whether the potential freeze condition exists, and if so, waking up the controller to perform the purge.

7. The system according to claim 1 wherein the fuel cell system is on a vehicle.

8. A fuel cell system for a vehicle, said system comprising:
a fuel cell stack including reactant gas flow channels;
a compressor for forcing air through the reactant gas flow channels;
a controller configured to control the fuel cell system, said controller determining whether a potential freeze condition exists at fuel cell system shut-down based on predetermined parameters, said controller causing the compressor to purge the reactant gas flow channels if the potential freeze condition does exist, said controller shutting the fuel cell system down normally without a reactive gas flow channel purge if the potential for a freeze condition does not exist, said controller periodically determining after the normal shut-down whether a potential freeze condition exists, and said controller performing the reactant gas flow channel purge if the subsequent determination of a potential freeze condition exists, said controller initiating a keep warm strategy if the controller determines that the potential freeze condition exists after system shut-down before performing the purge, wherein the controller determines whether there is enough fuel or battery energy to perform the keep warm strategy based on predetermined criteria, and if not, perform the purge; and
a wake-up circuit for waking up the controller to perform the purge after system shut-down.

9. The system according to claim 8 further comprising a temperature sensor, said temperature sensor providing a temperature signal to the controller that indicates whether the potential freeze condition exists.

10. The system according to claim 8 further comprising a receiver that receives wireless signals that provide an indication of the potential freeze condition.

11. The system according to claim 8 wherein the predetermined parameters include one or more of ambient temperature, cooling fluid temperature, stack temperature, geographical location, date and weather reports.

12. The system according to claim 8 wherein the wake-up circuit is a wake-up timer circuit that periodically wakes up the controller after system shut-down to determine whether the potential freeze condition exists based on the predetermined parameters.

13. The system according to claim 8 wherein the wake-up circuit is a wake-up check circuit including a temperature sensor for measuring the temperature, said wake-up check circuit comparing the measured temperature to a temperature threshold to determine whether the potential freeze condition exists, and if so, waking up the controller to perform the purge.

14. The system according to claim 8 wherein the predetermined criteria is selected from the group consisting of geographical information, user profile information and distance to a fueling station.

* * * * *